United States Patent [19]

Schlichthorst

[11] Patent Number: 4,702,189

[45] Date of Patent: Oct. 27, 1987

[54] MULTIPLE-HULLED MARINE CRAFT

[75] Inventor: Norbert Schlichthorst, Beckdorf, Fed. Rep. of Germany

[73] Assignee: Blohm & Voss AG, Beckdorf, Fed. Rep. of Germany

[21] Appl. No.: 863,236

[22] Filed: May 14, 1986

[30] Foreign Application Priority Data

May 17, 1985 [DE] Fed. Rep. of Germany ....... 3517863

[51] Int. Cl.$^4$ .............................................. B63B 1/00
[52] U.S. Cl. ................................... 114/61; 114/67 A; 180/126
[58] Field of Search ........... 114/61, 36, 201 R, 201 A, 114/67 A, 51; 180/116, 126

[56] References Cited

U.S. PATENT DOCUMENTS 3,677,212 7/1972 Gregoire .............................. 114/61
4,312,287 1/1982 Kuo ...................................... 114/61

Primary Examiner—Jeffrey V. Nase
Assistant Examiner—Jesûs D. Sotelo

[57] ABSTRACT

Figure 2:
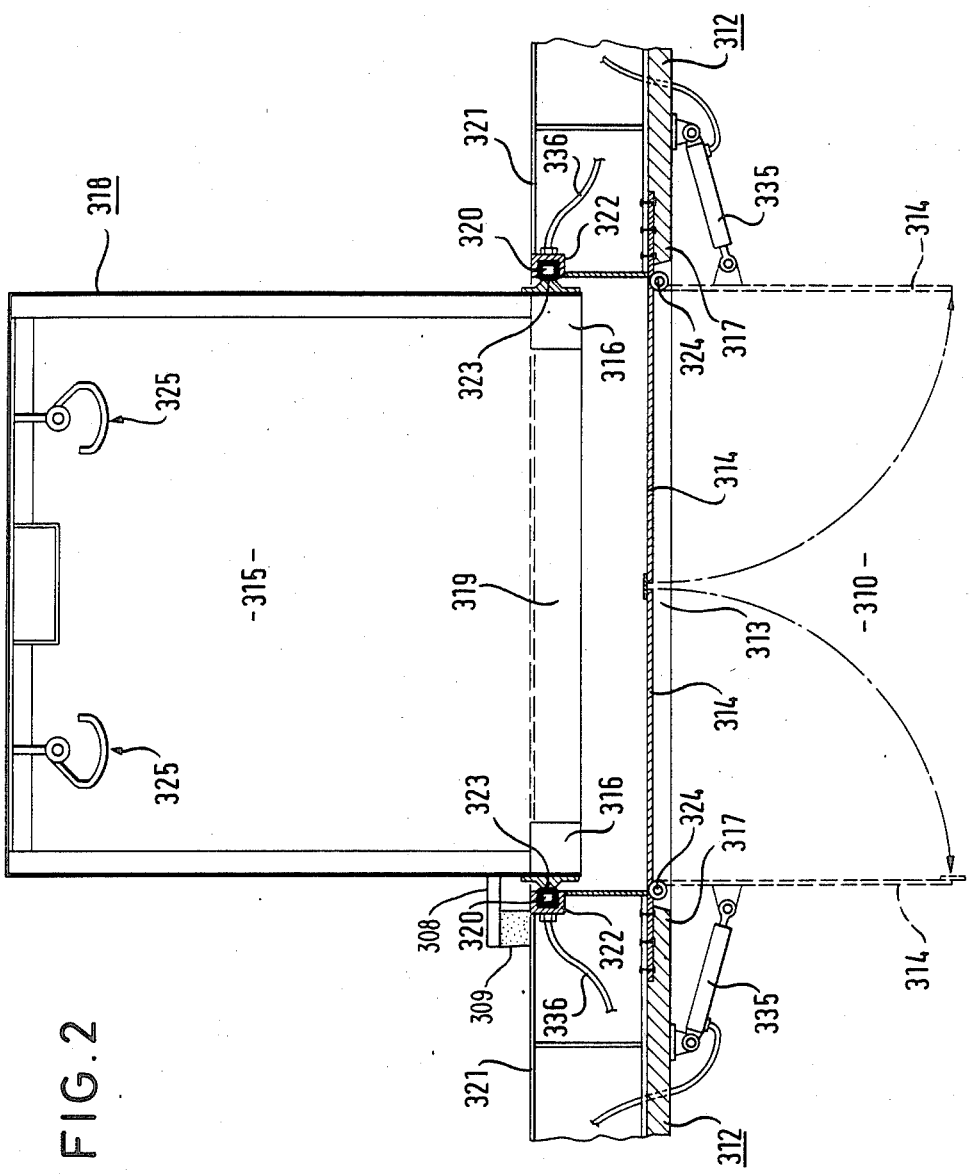

In a multiple-hulled marine craft an opening (313) which can be closed in air-tight and water-tight manner by pivotable flaps (314) is located in the transverse deck (312) beneath the connection structure between the two floats (311) (FIG. 2).

6 Claims, 2 Drawing Figures

MULTIPLE-HULLED MARINE CRAFT

The invention relates to a multiple-hulled marine craft having at least two floats which extend in the direction of travel, which are arranged spaced apart and parallel to one another, and which are connected together at the top by a connection structure which carries built-in structures and which has, at the bottom, a transverse deck disposed above the waterline. Preferably the invention relates to catamaran craft.

The invention is in particular concerned with a catamaran-type air cushion craft comprising two floats which extend in the direction of travel and are arranged spaced apart parallel to one another, with the cross-section of the floats becoming broader from the bottom upwardly, and with the floats being connected rigidly together at the top via a deck structure; front and rear resilient skirts arranged between the floats which extend at least approximately to the water surface and, together with the floats, bound an air chamber between the base of the deck structure and the water surface; main propulsion units which drive thrust means arranged in the stern region of the floats; and fans which blow air sucked in from the outside into the bounded air chamber beneath the base of the deck structure to lift the marine craft from travel in the displacement mode to travel in the hovercraft mode.

With catamaran type marine craft of this kind the problem frequently exists of dropping articles, for example oceanographic probes or buoys from the interior of the ship into the water. Under certain circumstances the requirement can also exist to take articles from the surface of the water into the interior of the ship.

The object of the present invention is to provide a multiple hulled marine craft of the initially named kind in which articles can be dropped without problem and substantially invisibly from the outside into the water or can, if required, also be taken out of the water.

In order to satisfy this object the invention provides that at least one closable opening is provided in the transverse deck.

The inventive thought is thus to be seen in the fact that one provides a closable opening in the lowermost deck between the floats with the opening into the air chamber above the water surface between the floats. In this way articles can be conveyed in the vertical direction from the body of the ship into the water, or in the opposite direction, without being visible from the outside, and largely unhindered by movements of the water surface which are too strong or by adverse weather. So far as, in accordance with a preferred embodiment, one is concerned with a multiple hulled air cushion marine craft, provision should be made in accordance with the invention that the opening is closable in water-tight and gas-tight manner by a plate arrangement. When the plate arrangement is closed the hovercraft mode of operation is not hindered in any way.

In order also to be able to open the plate arrangement and to drop articles into the water during operation of the craft in the hovercraft mode, i.e. not only during travel in the displacement mode, a particularly preferred embodiment of the invention provides that an air-tight chamber which is open at the bottom is provided above the opening, with the lower edge of the chamber being sealingly connected all around the opening with the marginal regions of the transverse deck which surround the opening. In other words, in this embodiment, the chamber containing the articles which are to be dropped or are to be picked-up is included in the air cushion pressure chamber beneath the craft. In order to have adequate free space available the opening should in particular be rectangular. Its preferred cross-section amounts approximately 3 to 7 m×2 to 3 m.

The invention is in particular preferably used in an air cushion craft such as is described in co-pending patent application Ser. No. 863,148 filed May 14, 1986 entitled "Catamaran-type marine craft" of the same applicants. Here the two floats are connected rigidly at the top by trussed girders on which standardised containers containing the inbuilt structure of the ship and passage elements are suspended. In a catamaran-type air cushion marine craft of this kind it is preferable for the dimensions of the opening to correspond to the horizontal cross-section of a container having an open base which is arranged above the opening in vertical alignment therewith and which contains the air-tight chamber. The entire connection structure lies above the floats.

In order to be able to interchange the container containing the droppable articles without problem a further embodiment of the invention provides that the container is connected at the lower edge with support parts belonging to the connection structure via releasable sealing means.

A practical embodiment of the invention is characterised in that the sealing means consist an inflatable sealing hose which extends all around and surrounds the lower edge of the container, is arranged in a peripheral groove of the support part surrounding the opening, and in the inflated state sealingly contacts all around an outer peripheral sealing counterflange of the lower edge of the container.

By releasing the sealing means and the securing of the container to the bearing blocks the latter can easily be removed from the body of the ship and replaced with another correspondingly constructed container with droppable articles suspended therein.

It is however preferred for the container to be held to the connection structure preferably at the front and the rear via bearing blocks which are in particular shock damped. Thus, apart from the sealing means special securing means are also provided, which are preferably constructed in the same way as in co-pending patent application Ser. No. 863,148.

A particularly advantageous constructional embodiment is characterized in that the plate arrangement consists of two flaps which are preferably pivotable downwardly about pivot axes pointing in the longitudinal direction of the ship. As a result of this construction the air and if required also the water resistance of the outwardly pivoted flaps is negligible so that the travelworthiness of the marine craft is not impaired when the flaps are pivoted outwardly.

Since the chamber cannot normally be entered from the outside because of the pressure prevailing therein, and because of the continuous opening at the floor a further embodiment of the invention provides that suspension devices, which are preferably releasable by a control device arranged outside of the chamber, are provided in the chamber for articles which can be dropped through the opening.

The articles which are to be dropped and which have already been inserted prior to installing the container in the ship can thus be released without problem from outside of the chamber from the suspension devices after the flaps closing the opening have been moved away.

An opening is advantageously only arranged in the sternmost third of the ship, where the water surface between the floats is in general already very calm. Moreover, the opening should be arranged in a catamaran at the centre of the ship. It is particularly preferred for the floats to have adequate height above the displacement waterline so that in the downwardly pivoted state the pivotal flaps are still spaced by a substantial distance of for example 2 m from the water surface. The outwardly pivoted flaps should thus only come into contact with the water surface in exceptional cases during travel in the displacement mode, i.e. with very heavy seas, but not otherwise.

Figure 1:
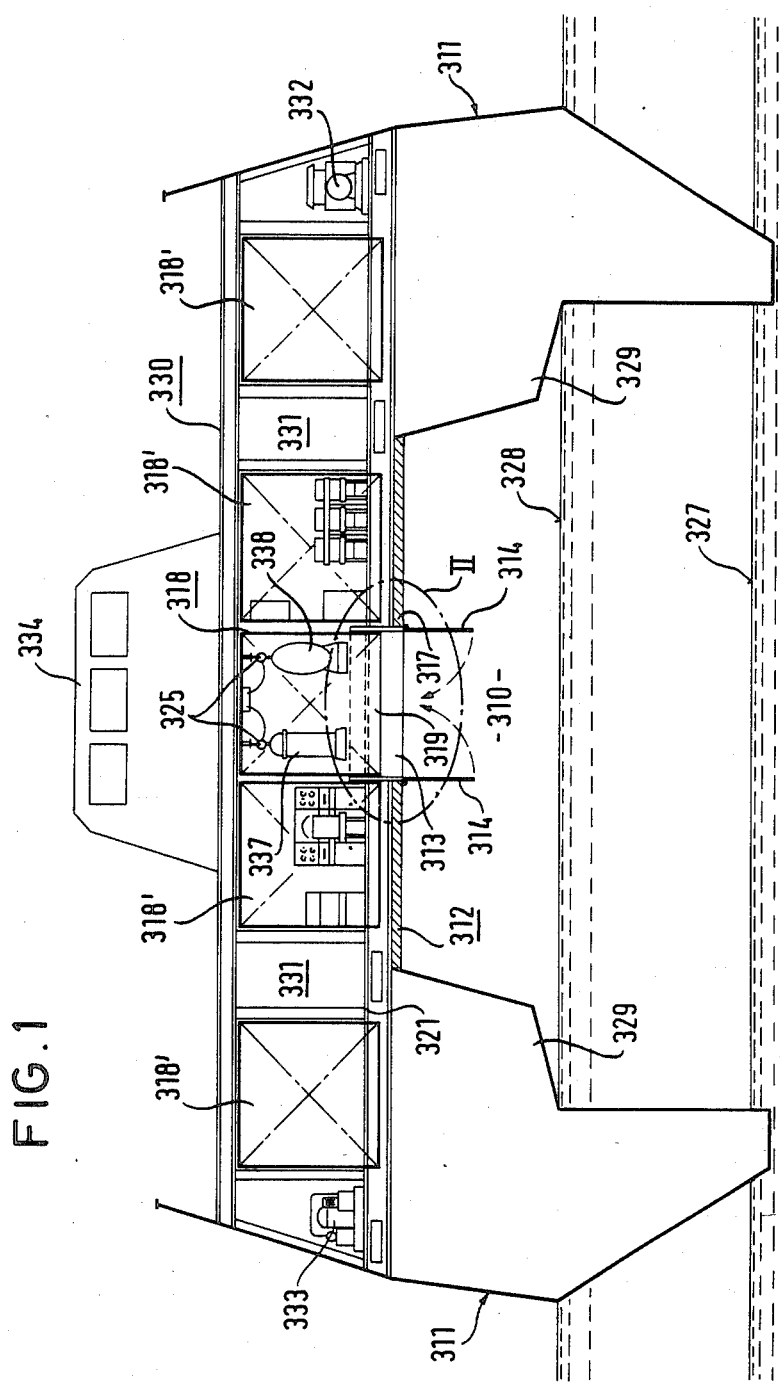

The invention will now be described in the following with reference to the drawings which show:

FIG. 1 a schematic cross-section of a multiple hulled marine craft in accordance with the invention equipped with two floats or hulls, and FIG. 2 the section II of FIG. 1 to an enlarged scale.

As seen in FIG. 1 the catamaran-type air cushion craft of the invention, which has air cushion sealing skirts which are not shown at the stem and at the stern, has two floats 311 extending parallel to one another. During hovercraft operation the floats have the hovercraft waterline 327, which lies near to the bottom end of the floats 311, and submerge, during displacement operation, into the water surface up to the displacement waterline 328. In the region of the displacement waterline 328 the floats have an inwardly directed step 329 so that in the upper half they are approximately twice as broad as they are beneath it.

The air cushion chamber 310 is thus bounded by the floats 311, by the non-illustrated skirts which extend between the floats, by the transverse deck 312 and by the waterlines 327 and 328 respectively.

The floats 311 are fixedly connected together at specific longitudinal spacings by transverse trussed girders between which standardised containers 318' are secured. The transverse trussed girders 330 lie with their lower side on the upper side of the floats 311 and are in particular rigidly connected with the bulkheads of the floats. Moreover, passageway elements 331 representing horizontal communication paths extend in and between the transverse trussed girders 330, but are only schematically illustrated in FIG. 1.

Inside the containers 318' one finds the usual inbuilt structures of a ship including the crews chambers. Auxiliary engines or other aggregates 333 can be accommodated in the lateral regions alongside the standardised containers 318' arranged above the floats 311. The main propulsion units are located in the upper broader region of the floats 311. A bridge module 334 is mounted at the top on the connection structure formed by the transverse trussed girders 330.

As seen in FIGS. 1 and 2 a rectangular opening 313 is located in the transverse deck 312 in the sternmost third of the connection structure between two sequential transverse trussed girders 330. The transverse deck 312 closes off the connection structure formed by the transverse trussed girders 330 at the bottom in water-tight and air-tight manner. Pivot axes 324, on which pivotal flaps 314 are arranged, point in the longitudinal direction of the ship and are disposed at both sides of the opening 313. The flaps 314 can be selectively pivoted by hydraulic cylinders 335 braced against the transverse deck 312 into the sealed closed position illustrated in solid lines in FIG. 2 or can be pivoted downwardly into the open position shown in broken lines in FIG. 1 in which they project downwardly away from the transverse deck 312.

Support parts 321 are arranged on the transverse trussed girders 330 all around the opening 313 with the transverse deck 312 being arranged beneath the support parts 321. The support parts 321 surround the rectangular opening 313.

A peripheral groove 322 is provided at the inner periphery of the support parts 321 and an inflatable sealing hose 320 is located all around the peripheral groove and can be connected via pneumatic or hydraulic lines 336 and non-illustrated valves to a pressure source.

The lower edge 316 of a standardised container 318 is arranged above the opening 313 within the chamber defined by the ring seal hose 320 and is distinguished from the other containers 318' in that its base 319 is open. Seal counter-surfaces 323 are provided all around the lower edge 316 and come to lie horizontally opposite to the ring seal hose 320 in the installed state of the container 318. More specifically, the container 318 may be supported on shock-absorbing means 309 extending between supporting projections 309 extending between supporting projections 308, mounted to the lower parts of the container sides above the support parts 321, and the support parts 321.

In the illustrated installed position of the container 318 its internal chamber 315 is sealed off in pressure-tight manner against the remaining parts of the connection structure. The chamber 315 is connected pressure-wise with the air cushion chamber 310 between the floats 311 and below the transverse deck 312.

The pivot axes 324 of the pivotable flaps 314 are secured to the marginal regions 317 of the transverse deck 312 which surround the rectangular opening 313.

Suspension devices 325 on which articles, for example measuring buoys 337 or measuring probes 338, are suspended are provided inside the container 318, preferably in the region of its ceiling. The suspension devices 325 can be remotely operated from outside of the container 318 so that the articles 337, 338 are released from them and can fall through the freed opening 313 past the outwardly pivoted pivotal flaps 314 into the water.

If required lifting devices could also be provided inside the container 318 by means of which sensitive articles could be slowly dropped through the opening 313 into the water, or could if necessary also be picked-up out of the water.

I claim:

1. A multiple-hulled air cushion marine craft, comprising: at least two floats which extend in the direction of travel of the craft said floats being arranged spaced apart from, and parallel to, one another, and connected together at a top thereof by a connection structure which carries built-in structures and which has, at a bottom thereof a transverse deck disposed above the waterline, at least one closable opening located in the transverse deck and closable in a water-tight and gas-tight manner by a plate arrangement, said opening being rectangular, and its dimensions corresponding to the horizontal cross-section of a container having an open base and which is arranged above the opening in vertical alignment therewith and contains an air-tight chamber, said container being connected at a lower edge thereof via releasable sealing means with support parts of the connection structure.

2. A marine craft in accordance with claim 1, wherein the sealing means comprise an inflatable sealing hose which extends all around and surrounds a lower edge of the container, is arranged in a peripheral groove of the support parts surrounding the opening, and in inflated state, sealingly contacts all around an outer peripheral sealing counterflange of the lower edge of the container.

3. A marine craft in accordance with claim 1, comprising bearing blocks which hold the container at a front and a rear end thereof on the connection structure.

4. A marine craft in accordance with claim 3, wherein said bearing blocks are shock-damped.

5. A marine craft in accordance with claim 1, wherein the plate arrangement consists of two flaps which are pivotable about pivot axes pointing in the longitudinal direction of the craft.

6. A marine craft in accordance with claim 1, comprising suspension devices in said container for articles to be dropped through the opening, and a control device arranged outside said chamber for releasing said suspension devices.

* * * * *